(12) United States Patent
Ushimaru (10) Patent No.: US 8,025,824 B2
(45) Date of Patent: Sep. 27, 2011

(54) PROCESS FOR PRODUCING REFRACTORY PARTICLES

(75) Inventor: Yukihiro Ushimaru, Takasago (JP)

(73) Assignee: AGC Ceramics Co., Ltd., Tokyo (JP)

( * ) Notice: Subject to any disclaimer, the term of this patent is extended or adjusted under 35 U.S.C. 154(b) by 0 days.

(21) Appl. No.: 12/794,839

(22) Filed: Jun. 7, 2010

(65) Prior Publication Data

US 2010/0240518 A1    Sep. 23, 2010

Related U.S. Application Data

(63) Continuation of application No. PCT/JP2008/072192, filed on Dec. 5, 2008.

(30) Foreign Application Priority Data

Dec. 6, 2007    (JP) .................................. 2007-316416

(51) Int. Cl.
  *B29B 9/00*    (2006.01)
  *C04B 35/48*    (2006.01)
  *C04B 35/49*    (2006.01)
  *C04B 35/00*    (2006.01)

(52) U.S. Cl. ................ 264/12; 264/5; 264/11; 501/103; 501/105; 501/153

(58) Field of Classification Search .................. 501/103, 501/105, 153, 154; 428/402, 403, 404; 264/5, 264/9, 11, 12
See application file for complete search history.

(56) References Cited

U.S. PATENT DOCUMENTS

| 2,862,792 | A | * | 12/1958 | Rehm | ........................ 423/337 |
| 4,508,841 | A | * | 4/1985 | Onuma et al. | ................... 502/73 |
| 5,424,260 | A | * | 6/1995 | Yerushalmi et al. | .......... 501/155 |
| 5,567,214 | A | * | 10/1996 | Ashley | ............................ 51/309 |
| 5,994,252 | A | * | 11/1999 | Feige et al. | ................... 501/128 |

FOREIGN PATENT DOCUMENTS

| JP | 05-096265 | 4/1993 |
| JP | 07-053258 | 2/1995 |
| JP | 2002-263606 | 9/2002 |
| JP | 2003-212667 | 7/2003 |
| JP | 2003-251434 | 9/2003 |
| JP | 2005-193267 | 7/2005 |

* cited by examiner

*Primary Examiner* — Jerry A Lorengo
*Assistant Examiner* — Noah Wiese
(74) *Attorney, Agent, or Firm* — Oblon, Spivak, McClelland, Maier & Neustadt, L.L.P.

(57) ABSTRACT

To provide a process for producing high-purity highly oxidized refractory particles easily with good productivity by treating a spent refractory containing $ZrO_2$ and $Al_2O_3$ to reduce components other than $ZrO_2$ and $Al_2O_3$ to levels unproblematic for practical use as raw material for electrofused refractories and to increase the content of the $ZrO_2$ and/or $Al_2O_3$ component.

A process for producing refractory particles, which comprises introducing to and melting in a melting furnace both a spent refractory which contains, by mass % as chemical components, from 75 to 97% of $ZrO_2$ and/or $Al_2O_3$, from 2 to 25% of $SiO_2$, from 0.4 to 7% in total of $Na_2O$, $K_2O$ and $Li_2O$ ($Na_2O+K_2O+Li_2O$), at most 2% of CaO and at most 2% of MgO, and carbon particles in an amount of from 1 to 8% by outer mass percentage based on the spent refractory, and after the melting, tapping the melt while blowing compressed air against the melt to form refractory particles having the content of $ZrO_2$ and/or $Al_2O_3$ increased.

16 Claims, 1 Drawing Sheet

Fig. 1

PROCESS FOR PRODUCING REFRACTORY PARTICLES

TECHNICAL FIELD

The present invention relates to a process for producing refractory particles, which is simple and excellent in the productivity, and which is a process for producing high-purity highly oxidized refractory particles having the content of $ZrO_2$ component and/or $Al_2O_3$ component increased, from a spent alumina-, zirconia- or alumina/zirconia-type refractory containing components other than desired chemical components.

BACKGROUND ART

As a method for recycling a spent refractory, Patent Document 1 proposes a method wherein refractories used in an iron-making factory are subjected to e.g. sorting depending upon the respective sites of their use, then crushed and re-used as they are, as refractories. However, by such a proposal, the obtained raw material contained a large amount of impurities and could not be re-used as a raw material for electrofused refractories, which requires a level of the impurity content to be at least one digit lower than that of common bonded refractories, such that the required level of the impurity content is, for example, not higher than 0.1 mass % of $Fe_2O_3$ or not higher than 0.2 mass % of $TiO_2$.

Further, by this proposal, the obtained raw material is simply crushed, and there has been a problem such that due to the crushing, the recycled raw material is likely to be re-contaminated, and such a recycled raw material is useful only as a low grade refractory. Among spent refractories, particularly, a spent electrofused refractory contains a large amount of a useful mineral source such as zirconia, and if it can be recycled again as an electrofused refractory, such will be an effective use of resource.

Patent Documents 2 and 3 propose methods wherein carbon is added to a spent refractory other than the electrofused refractory, followed by melt reduction treatment. Patent Document 2 proposes a method wherein a waste material of a chromium-containing refractory used in a steel-making process or a cement-manufacturing process, is subjected to electromelting treatment to obtain a solidified product having a spinel composition. However, with respect to a method for treatment of an electrofused refractory to be used for e.g. a glass melting furnace, no specific proposal is made. Further, the melt treated product is in the form of an ingot, and a post-process step of e.g. crushing is separately required to prepare refractory particles from the ingot, thus leading to not only an increase of the production cost but also a problem such that impurities are likely to be included in such a step of e.g. crushing thereby to lower the $ZrO_2$ component and/or the $Al_2O_3$ component as useful refractory components.

Like Patent Document 2, Patent Document 3 proposes a method wherein carbon is added to a spent refractory generated in an iron-making factory, followed by melt reduction treatment. However, with respect to a treatment method for an electrofused refractory used for e.g. a glass melting furnace, no specific proposal is made, and further, since the melt-treated product is in the form of an ingot, a step of e.g. crushing is required to prepare refractory particles from the ingot, thus leading to a problem such that impurities are likely to be included during such a step. That is, by the methods proposed in Patent Documents 2 and 3, it was not possible to use a spent refractory as a raw material for an electrofused refractory, for which a high purity is required.

Further, as an important index required for an electrofused refractory, an oxidized degree of a constituting mineral may be mentioned. That is, if an electrofused refractory is constituted by a mineral in a state where oxygen of an oxide is partially missing, such a constituting mineral is likely to react with glass to generate bubbles thereby to contaminate the glass. In the methods proposed in Patent Documents 2 and 3, the melt-treated product is recovered in the form of an ingot, whereby carbon will remain at a high level in the recycled raw material.

The remaining carbon particles will work also as a reducing agent, and the recycled material cannot be used as it is as a raw material for an electrofused refractory, and it has been required to carry out heat treatment in the atmosphere, separately, in order to eliminate an oxygen deficiency.

Patent Document 4 discloses that wastes such as municipal wastes, industrial wastes or sewage sludges (they are usually vitreous with a large content of $SiO_2$, CaO and $Na_2O$) are melted for the purpose of volume reduction or detoxifying, but discloses or suggests nothing about adding carbon to a spent refractory which is not vitreous or increasing the purity of a spent refractory by adding carbon, followed by melting. Further, in Patent Document 4, the main invention is an invention relating to a lining refractory for a melting furnace.

Further, as a method for directly forming particles from a melt, Patent Document 5 proposes a method of blowing high speed air to a melt for air granulation. Patent Document 5 discloses that a raw material to form mullite, is melted to obtain mullite, but discloses or suggests nothing about a method of adding carbon to a waste, followed by melting to increase the purity of useful components.

In any case, there has been no proposal for an industrial method for treating a spent refractory to remarkably reduce components other than useful components such as $ZrO_2$, $Al_2O_3$, etc. thereby to highly purify it and regenerate it to such a level as useful as a raw material for an electrofused refractory thereby to obtain high purity refractory particles.

Patent Document 1: JP-A-2003-212667
Patent Document 2: JP-A-5-96265
Patent Document 3: JP-A-2002-263606
Patent Document 4: JP-A-7-53258
Patent Document 5: JP-A-2003-251434

DISCLOSURE OF THE INVENTION

Object to be Accomplished by the Invention

It is an object of the present invention to provide a process for producing high purity highly oxidized refractory particles easily with good productivity by treating a spent refractory containing $ZrO_2$ and/or $Al_2O_3$ to reduce components other than the components such as $ZrO_2$, $Al_2O_3$, etc. to levels unproblematic for practical use as a raw material for electrofused refractories and to increase the content of the $ZrO_2$ component and/or the $Al_2O_3$ component.

Means to Accomplish the Object

The present invention provides a process for producing refractory particles, which comprises introducing to and melting in a melting furnace both a spent refractory which contains, by mass % as chemical components, from 75 to 97% of $ZrO_2$ and/or $Al_2O_3$, from 2 to 25% of $SiO_2$, from 0.4 to 7% in total of $Na_2O$, $K_2O$ and $Li_2O$ ($Na_2O+K_2O+Li_2O$), at most 2% of CaO and at most 2% of MgO, and carbon particles in an amount of from 1 to 8% by outer mass percentage based on the spent refractory, and after the melting, tapping the melt while blowing compressed air against the melt to form refractory particles having the content of $ZrO_2$ and/or $Al_2O_3$ increased.

Advantageous Effects of the Invention

In a conventional melt treating method, the melt is formed into an ingot, and it is necessary to carry out crushing, heat treatment, etc. in order to obtain refractory particles from such an ingot, whereby there has been a problem such that impurities are likely to be included in the process for crushing, etc. thereby to lower the content of the $ZrO_2$ component and/or the $Al_2O_3$ component. Whereas, in the present invention, the melt is formed directly into high purity refractory particles, whereby there will be no trouble of lowering the purity of the $ZrO_2$ component and/or the $Al_2O_3$ component as a useful component.

That is, by the conventional recycling method, a spent refractory may be recycled only as a refractory raw material for e.g. bonded bricks having a low level of required purity. Whereas, according to the present invention, such a spent refractory can be recycled as a raw material for a refractory where high purity is required.

Further, in the conventional melt treating method, if particles are obtained by a method of crushing such an ingot, carbon in the raw material or carbon in the melt as included from the electrodes will remain as it is in the particles, whereby the obtained oxide will be an oxygen-deficient state, and such a material may not be used as a raw material for an electrofused refractory. Whereas, in the process of the present invention, the material is reacted with oxygen in air and oxidized to eliminate the oxygen-deficient state in the step for forming particles, and the remaining carbon will be reduced to a level unproblematic for practical use.

Further, according to the present invention, a spent refractory which used to be disposed, can be highly purified and can be recycled as a raw material for an electrofused refractory, and valuable zirconia and alumina resources can be recycled. Thus, the contribution to reducing the load to the global environment is substantial.

In the present invention, water may be blown together with the compressed air in the step of forming recycled refractory particles, whereby cooling can be carried out at the same time as grain refining, and thus the working efficiency and productivity will be remarkably improved.

Further, the present invention does not require crushing to form refractory particles from an ingot or heat treatment to eliminate the oxygen-deficient state, and thus, the production process can be simplified, and the productivity will be excellent. Thus, the contribution to reduction of the costs will be substantial.

REFERENCE NUMERALS

| 1: | Melting furnace main body |
|---|---|
| 2: | Melting electrode |
| 3: | Melt |
| 4: | Tapping hole |
| 5: | Nozzle |
| 6: | Compressed air |

-continued

REFERENCE NUMERALS

| 7: | Particles |
|---|---|
| 8: | Collection box |

BEST MODE FOR CARRYING OUT THE INVENTION

In this specification, the spent refractory is not limited to a refractory actually used but also includes a waste generated as trash in the process for producing refractory products, such as molding, firing, casting, cutting, grinding, etc., and defective products rejected as not satisfying the specification for the products.

Further, in this specification, "to increase the purity" means to increase the content of the $ZrO_2$ component and/or the $Al_2O_3$ component and to reduce other components.

Further, the refractory is used as having substantially the same meaning as ceramics, and an electrofused refractory is a general term for a refractory produced by an electrical melt casting process.

In the process for producing refractory particles of the present invention (hereinafter referred to also as the process of the present invention), a spent refractory which contains, by mass % as chemical components, from 75 to 97% of $ZrO_2$ and/or $Al_2O_3$, from 2 to 25% of $SiO_2$, from 0.4 to 7% in total of $Na_2O$, $K_2O$ and $Li_2O$ ($Na_2O+K_2O+Li_2O$), at most 2% of CaO and at most 2% of MgO, is used as a starting raw material.

Such a spent refractory is not particularly limited with respect to the application, production process, etc. so long as it is a refractory having the above chemical components. Among them, a spent electrofused refractory which used to be not recycled as a material for electrofused refractory by a conventional recycling method, is preferred, since the characteristics of the process of the present invention can thereby be most effectively be utilized.

A specific example of such a spent electrofused refractory may, for example, be one using an alumina-type electrofused refractory such as an $Al_2O_3$—$Na_2O$ type (hereinafter referred to simply as AN-type) electrofused refractory or an $Al_2O_3$—$SiO_2$ type (hereinafter referred to simply as AS-type) electrofused refractory, a zirconia-type (hereinafter referred to simply as Z-type) electrofused refractory having a $ZrO_2$ content of at least 85 mass % (hereinafter, the mass % may simply be represented by % unless otherwise specified) or an $Al_2O_3$—$ZrO_2$—$SiO_2$ type (hereinafter referred to simply as AZS-type) electrofused refractory.

In the process of the present invention, the content of the $ZrO_2$ component and/or the $Al_2O_3$ component in the spent refractory is from 75 to 97%, preferably from 85 to 97%. Hereinafter, the content of the $ZrO_2$ component and/or the $Al_2O_3$ component will be referred to simply as the ZA content. However, the ZA content does not necessarily mean that both the $ZrO_2$ component and the $Al_2O_3$ component are contained. In this specification, it is used also in a case where only one of the $ZrO_2$ component and the $Al_2O_3$ component is contained.

Even if the ZA content in the spent refractory is less than 75%, it is possible to highly increase the purity, but more electric power and time will be consumed, and the production costs will increase, whereby the industrial value will decrease.

On the other hand, even if the ZA content in the spent refractory exceeds 97%, it is possible to further increase the purity, but in such a case, the impurity content is sufficiently low, and such a spent refractory can be used as it is as a raw material, and it is unnecessary to use the process of the present invention.

In the process of the present invention, with respect to the chemical components of the spent refractory to be treated, a $SiO_2$ component may be mentioned as the main chemical component other than the $ZrO_2$ component and the $Al_2O_3$ component. In the process of the present invention, the content of the $SiO_2$ component in the spent refractory is from 2 to 25%, preferably from 2 to 16%. If the content of the $SiO_2$ component is less than 2%, such a spent refractory may usually be used as it is, as a raw material for refractories.

On the other hand, if the content of the $SiO_2$ component in the spent refractory exceeds 25%, although it is possible to increase the purity, a large amount of electric power is required to realize the desired purity, and the melting time tends to be long, thus leading to an increase of the production costs and a decrease in the production efficiency of the refractory particles.

In the process of the present invention, the total amount of the $Na_2O$ component, the $K_2O$ component and the $Li_2O$ component ($Na_2O+K_2O+Li_2O$: hereinafter referred to simply as the total amount of alkali components), of the spent refractory is from 0.4 to 7%. Here, the total amount of alkali components does not necessarily mean that all of the $Na_2O$ component, the $K_2O$ component and the $Li_2O$ component are contained, and among the three components, only the $Na_2O$ component or the $K_2O$ component may be contained.

If the total amount of alkali components in the spent refractory is less than 0.4%, such a refractory may be used as it is as a raw material for refractories, and it is not necessarily required to carry out the purification by the process of the present invention. On the other hand, if the total content of alkali components exceeds 7%, it becomes difficult to control the molten state, such being undesirable.

The total content of alkali components in the spent refractory gives a substantial influence over the melting reaction. Accordingly, the smaller the total content, the easier the control of the process of the present invention, such being preferred. For example, the total content of alkali components is preferably at most 4%, more preferably at most 3%.

In the process of the present invention, the content of the CaO component in the spent refractory is at most 2%. If the content of the CaO component in the spent refractory exceeds 2%, it is difficult to substantially remove the CaO component by the process of the present invention, and accordingly, it becomes difficult to use the obtained refractory particles for an application to an electrofused refractory. For the same reason, the content of the CaO component in the spent refractory is preferably at most 1%, and the CaO component is more preferably at most 0.3%.

In the process of the present invention, the content of the MgO component in the spent refractory is at most 2%. If the content of the MgO component in the spent refractory exceeds 2%, it is difficult to substantially remove the MgO component by the process of the present invention, and accordingly, it becomes difficult to use the obtained refractory particles for an application to an electrofused refractory. For the same reason, the content of the MgO component in the spent refractory is preferably at most 1%, and the MgO component is more preferably at most 0.5%.

In the process of the present invention, the particle diameter (hereinafter referred to as a particle size) of the spent refractory is not particularly limited, but the particle size is preferably made to be at most 100 mm, since such particles can easily be mixed with carbon particles, and the handling will also be easy.

The particle size of the spent refractory particles is more preferably at most 50 mm, further preferably from 3 to 30 mm. Here, in this specification, the particle size is represented by an aperture of a JIS sieve. For example, sieving is carried out by JIS sieves, whereby among sieves on which the particles remain, the minimum aperture is taken as the particle size.

In the process of the present invention, there is no particular limitation with respect to the purity, particle size, etc. of carbon particles. However, the purity of the carbon particles is preferably at least 95%, since an influence of inclusion of impurities over the product is little. The purity of carbon particles is more preferably at least 98%. As such carbon particles, a crushed product of a graphite plate, a crushed product of graphite electrodes or coke for a reduction reaction may, for example, be mentioned as preferred.

Further, in the process of the present invention, the particle size of the carbon particles is preferably from 1 to 10 mm, whereby the reduction reaction in the melting furnace may readily be uniform, and as a result, control of the melting furnace will also be easy. Further, the particle size of the carbon particles is preferably from 1 to 10 mm, whereby in a case where it is mixed with the spent refractory and introduced into a melting furnace in the form of a mixture, the uniformity of the mixture will be high.

It is undesirable that the particle size of the carbon particles becomes less than 1 mm, since the stability in the molten state is thereby deteriorated, and it becomes difficult to control the melting furnace. On the other hand, it is undesirable that the particle size of the carbon particles exceeds 10 mm, since the carbon particles tend to remain in the refractory particles as the product, whereby the quality of the refractory particles is deteriorated, and it becomes difficult to control the reaction during the melting. Further, the particle size of the carbon particles is more preferably at most 5 mm, since the time required for the melting reaction is thereby relatively short, and the productivity will be improved.

In the process of the present invention, the amount of the carbon particles to be added is from 1 to 8% by outer mass percentage. If the amount of the carbon particles is less than 1%, the effect for high purification tends to be inadequate. On the other hand, if the amount of the carbon particles exceeds 8%, the carbon tends to remain as a foreign matter in the refractory particles, such being undesirable. Further, in order to prevent the carbon particles from remaining, melting for a long period of time is required, and the productivity tends to be low, such being undesirable.

In the process of the present invention, the amount of the carbon particles is preferably at least 2%, more preferably at least 3%, whereby the effect for high purification can be certainly obtained. On the other hand, the amount of the carbon particles is preferably at most 7%, whereby remaining of the carbon particles can be prevented.

In the process of the present invention, the method for introducing the spent refractory and carbon particles is not particularly limited, but it is preferred that before the introduction to the melting furnace, the spent refractory and carbon particles are preliminarily mixed to form a mixed raw material for melting, and the mixed raw material for melting is introduced into the melting furnace, whereby control of the melt in the melting furnace becomes easy, and the productivity can be improved. In the process of the present invention, as a means to mix the spent refractory with carbon particles, a usual mixer for mixing refractory particles may, for example, be suitably used.

In the process of the present invention, it is preferred that firstly, the spent refractory is crushed to a particle size of at most 30 mm, and carbon particles are added and mixed to the crushed product to obtain a mixed raw material for melting. Then, the mixed raw material for melting is introduced to and melted in a melting furnace (electric furnace). The method for introducing the mixed raw material to the melting furnace is not particularly limited so long as it is one to stabilize the operation of the melting furnace. The following introduction method may be mentioned as preferred one.

In the process of the present invention, as the method for introducing the mixed raw material for melting, it is preferred that the raw material is introduced dividedly in a plurality of times rather than introduced all at once, since control of the operation of the melting furnace will thereby be easy. The number of times of the introduction is preferably at least 5 times (per one batch). However, if the number of times of the introduction is too many, the melting time is prolonged, and the productivity tends to be deteriorated. Therefore, it is preferably at most 15 times.

In the process of the present invention, if the number of times of the introduction is the same, it is preferred to adjust the introduction intervals to be from 5 to 10 minutes, whereby the melting time can be made minimum.

In the process of the present invention, in a case where the spent refractory and the carbon particles are introduced to the melting furnace without preliminarily mixed, a method may, for example, be employed wherein the spent refractory and the carbon particles are alternately introduced every once or every plurality of times.

In the process of the present invention, as the operation conditions at the time of melting the mixed raw material for melting in a melting furnace by using a common transformer of from 500 KVA to 5,000 KVA, it is preferred to adjust the voltage during arcing to be from 80 to 400 (V) and the current to be from 500 to 12,000 (A) in order to properly maintain the distance between the electrodes and the melt, to properly maintain the refractory in the electric furnace and to realize stabilized melting.

The final melting temperature is preferably from 1,900 to 2,300 (° C.) in order to obtain refractory particles having a sufficiently high purity. That is, at the initial stage of melting, the impurity level is high, and even if the melting temperature does not reach the above level, the reaction proceeds, and the impurities decrease, so that at the final stage, the melting temperature can reach the above level. Further, the electric energy required for the melting reaction is preferably from 2,500 kWH to 6,000 kWH depending upon the composition of the starting raw material, per ton (t) of the mixed raw material for melting.

In the process of the present invention, the raw material is reacted and melted for a prescribed time to form a melt having the content of the $ZrO_2$ component and/or the $Al_2O_3$ component increased, and then, the melt is tapped from a tapping hole formed in the exterior wall of the furnace. At the time of tapping, the furnace is preferably tilted to facilitate tapping. After the melt is permitted to flow out of the tapping hole and fall about 100 mm, compressed air is preferably blown against it from behind for grain refining. At the time of such grain refining, the surface area will be increased and oxidized in contact with the air to form highly purified, highly oxidized good refractory particles.

In the process of the present invention, the melting furnace to be used is not particularly limited so long as it is one capable of melting the above mixed raw material for melting. As a specific type of the melting furnace, one having a heating system of e.g. a burner, electrical resistance, arcing or coke may be mentioned. The arcing type is particularly preferred, since it is thereby possible to obtain a high temperature relatively easily, and yet, the melt will be highly homogeneous, and installation of the furnace is simple and the operation efficiency will be excellent.

Such a refractory for lining the inside of the melting furnace is not particularly limited. However, a refractory having a composition close to the composition of the high purity refractory particles to be produced, is preferred. Further preferred is a refractory containing impurities at a level lower than the targeted impurity level of the refractory particles.

For example, a zirconia type electrofused brick containing about 95% of zirconia, or an alumina type electrofused brick containing at least 95% of alumina, is preferred in order not to increase the targeted impurity level of the refractory particles.

Figure 1:
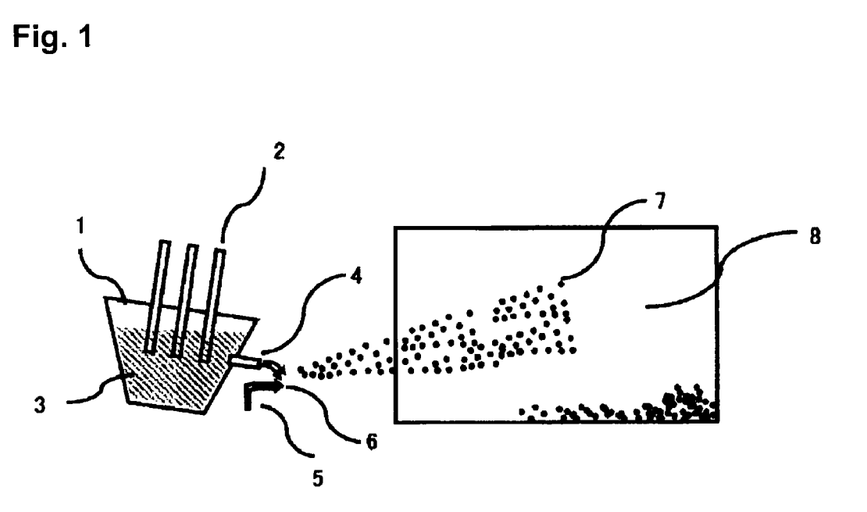
FIG. 1 is a schematic view illustrating the step of forming particles.

FIG. 1 shows a schematic view illustrating the grain refining after completion of the melting. In the FIG. 1 represents a melting furnace main body, 2 an electrode for the melting (melting electrode), and 3 a melt. The melting electrodes 2 are connected to a power source via a control system, not shown. The melt 3 is discharged from a tapping hole 4, and compressed air 6 or compressed air 6 and water, are blown against it from a nozzle 5 disposed behind the tapping hole 4, whereby the melt is formed into particles 7, which are suspended and recovered in a collection box 8.

By such compressed air, the particles are refined in a sufficiently oxidized state, so that a subsequent crushing step or heat treating step to oxidize particles, will be unnecessary.

In the process of the present invention, the pressure of the compressed air is preferably at least 1 MPa for blowing. The pressure of the compressed air is more preferably at least 2 MPa, particularly preferably at least 3 MPa. On the other hand, if the pressure of the compressed air exceeds 7 MPa, a usual installation may no longer be useful. Therefore, the pressure of the compressed air is preferably less than 7 MPa. The pressure of the compressed air is more preferably at most 6 MPa, since it is thereby possible to easily set the pressure.

The flow rate of the compressed air is preferably at least 50 m/sec, whereby at least 90% of particles will have a particle size of at most 15 mm, and no agglomeration will take place so that the subsequent handling will be easy, and further, the surface area is thereby increased so that oxidation will be accelerated. Such a flow rate is more preferably at least 80 m/sec, particularly preferably at least 100 m/sec. On the other hand, it is industrially difficult to increase the flow rate of the compressed air beyond 120 m/sec, and at most 120 m/sec is practically realistic. Further, in this specification, the flow rate of the compressed air is represented by a value at a position where the air is in contact with the melt tapped from the melting furnace, and the flow rate is usually one measured by a commercially available hot-wire flowmeter.

It is preferred that a predetermined amount of water is permitted to flow in the nozzle together with the compressed air to be blown together with the compressed air, whereby at the same time as grain refining, the temperature of the particles will be lowered (the water serves also as cooling water) to facilitate the subsequent handling. The water to be blown together with the compressed air is not particularly required to be highly pure. However, if an acidic or alkaline aqueous solution is used, at the time of recycling the obtained refractory particles as a refractory raw material, treatment such as washing with water will be required. Therefore, it is preferred to use neutral water.

In the process of the present invention, the amount of water to be used also as cooling water is preferably at least 0.1 L/sec., more preferably at least 0.2 L/sec. in order to sufficiently cool the particles. If the amount of water is too much, oxidation of refractory particles tends to be inadequate, and further, the particles will be soaking wet so that a post drying step will be required, such being undesirable. It is preferably at most 0.6 L/sec.

The object of the present invention is accomplished if the ZA total content in the obtainable refractory particles is improved over the ZA total content in the spent refractory. However, in consideration of the industrial value, the ZA total content in the refractory particles is preferably at least 95%, more preferably at least 98%.

The content of the $SiO_2$ component in the refractory particles produced by the process of the present invention is preferably at most 2%. In such a case, the reduction ratio of the $SiO_2$ component in the refractory particles to the $SiO_2$ component in the spent refractory, may be represented by the reduction ratio of the $SiO_2$ component=[(the content of the $SiO_2$ component in the spent refractory—the content of the $SiO_2$ component in the refractory particles)/the content of the $SiO_2$ component in the spent refractory]×100(%), and the reduction ratio is from 75% to 99%. Likewise, the total content of alkali components in the spent refractory is from 0.4 to 7%, and by application of the process of the present invention, it can be substantially reduced to a level of at most 0.3%. Further, the reduction ratio of the alkali components in the refractory particles to the alkali components in the spent refractory may be calculated in the same manner as for the reduction ratio of the $SiO_2$ component, and it is from 25% to 94%.

The carbon content in the refractory particles produced by the process of the present invention is preferably at most 200 ppm, so that the refractory particles can be recycled as a raw material for an electrofused refractory where the required level of impurities is severe. The carbon content in the refractory particles is more preferably at most 150 ppm, particularly preferably at most 100 ppm.

Likewise, in a case where a spent electrofused refractory is used as the spent refractory, when the $Fe_2O_3$ component in the spent electrofused refractory is at a level of from 0.2% to 1.0%, it can be substantially reduced to a level of at most 0.1% by application of the process of the present invention. Further, the reduction ratio of the $Fe_2O_3$ component in the obtained refractory particles to the $Fe_2O_3$ component in the spent electrofused refractory will be from 50% to 90% as calculated in the same manner as for the reduction ratio of the $SiO_2$ component.

In the process of the present invention, it is preferred that at least 90% of the refractory particles thereby obtained have a particle size of at most 15 mm, whereby the refractory particles are excellent in the handling efficiency as a raw material. The particle size of the refractory particles is more preferably from 0.05 to 15 mm, whereby not only the handling efficiency but also the flowability will be good. It is further preferred that at least 95% of the refractory particles have a particle size of from 0.05 to 15 mm.

Examples

Now, the present invention will be described in further detail with reference to Examples. However, it should be understood that the present invention is by no means restricted to such Examples.

[Case (1) of AZS-Type Electrofused Refractory]

An arcing type melting furnace having a furnace inner diameter of 800 mm, a height of 600 mm and a furnace inner capacity of 0.6 m³ was used as a test furnace, and as a transformer, 500 kVA was used. Here, as the lining refractory of the melting furnace, an electrofused refractory having a $ZrO_2$ content of at least 95% was used.

As the spent refractory, 100 g of an AZS-type electrofused refractory used for a glass melting furnace was used, and the chemical components were 44.95% of $Al_2O_3$, 14.8% of $SiO_2$, 37.6% of $ZrO_2$, 1.4% of $Na_2O$, 0.89% of $K_2O$, 0.19% of $Fe_2O_3$, 0.07% of $TiO_2$, 0.07% of CaO, 0.03% of MgO and 0% of C. The particle size was such that the particles passed through a sieve aperture of 30 mm (particle size: at most 30 mm).

To 100 kg of the spent AZS-type electrofused refractory, carbon particles having particle sizes of from 1 to 3 mm and an average particle size of 2 mm (tradename: Carbonet, manufactured by Asahi Coke Ind. Co., Ltd.) were added in an amount of 1%, 3%, 5%, 8%, 10% or 12%, followed by mixing sufficiently by a mixer having stirring vanes to obtain a mixed raw material for melting. Then, this mixed raw material for melting was put into the melting furnace and melted and highly purified.

The melting conditions were such that the voltage was from 100 V to 300 V, the electric power was from 100 kW to 400 kW, the amount of the mixed raw material for melting was from 7.5 kg to 15 kg every time, and the mixed raw material was introduced dividedly from 7 to 12 times with intervals of 5 minutes to 10 minutes. The total time for introduction of the mixed raw material for melting was from 50 minutes to 80 minutes. Further, the voltage and the electric power fluctuate during the melting and therefore, they are represented by an average voltage and an average electric power.

As the method for introducing the raw material, the smaller the raw material to be introduced every time, the easier the control of the reaction, and with the same amount of introduction, the smaller the ratio of the carbon particles, the easier the control of the reaction, and yet the shorter the time required for melting. The time from the initiation of introduction of the raw material to completion of the reaction was from 80 minutes to 102 minutes in a case where the amount of the carbon particles added was from 1% to 8% by outer percentage based on the spent refractory, but in a case where the amount of the carbon particles added was from 10% to 12% on the same basis, it took time for the stabilization of the reaction, and corrosion of the furnace material was so vigorous that melting was stopped after 120 minutes.

Then, 0.4 L/sec of water was added to compressed air under a pressure of 4 MPa, and as shown in FIG. 1, the compressed air was blown together with the water to the tapped melt from below to the front of the melt to form the melt into particles. The particles were recovered in a collection container made of metal and protected by a refractory, to obtain refractory particles. The flow rate of the compressed air at that time was 100 m/sec.

At least 95% of particle sizes of the obtained refractory particles were within a range of from 0.1 mm to 4 mm, and at least 98% were within a range of from 0.05 mm to 15 mm. The peak of the particle size at that time was 1.2 mm. When likewise the grain refining was carried out at a flow rate of the compressed air of 50 m/sec, at least 70% of particle sizes were within a range of from 0.1 mm to 4 mm, and at least 90% of particle sizes were within a range of from 0.05 mm to 15 mm.

The peak of the particle size at that time was 2.4 mm. In order to ascertain the condition required for the grain refining, the flow rate of the compressed air was further lowered to 32 m/sec, and the particle sizes of the obtained refractory particles were measured. At least 40% of the particle sizes were within a range of from 0.1 mm to 4 mm, and at least 80% of the particle sizes were within a range of from 0.05 mm to 15 mm. However, at this flow rate, the flying distance of the particles was inadequate, and they agglomerated below the tapping hole, and a part thereof could not be recycled as a raw material for refractory.

The chemical components of the obtained respective refractory particles were analyzed by a fluorescent X-ray diffractometer (manufactured by Rigaku Corporation), and the results (unit: mass %) are shown in Tables 1 and 2. Further, with respect to the residual carbon, the presence or absence of residual carbon particles was visually confirmed. Examples 1, 6 and 7 are Comparative Examples of the present invention, and Examples 2 to 5 are Working Examples of the present invention.

In Example 1, purification was observed, but did not reach the level required for a raw material for electrofused refractories. In Examples 2 to 7, the total content of alkali components ($Na_2O+K_2O+Li_2O$) of at most 0.3% and the $Fe_2O_3$ component of at most 0.1% were realized, which represent impurity levels desired for a raw material for electrofused bricks.

However, in Examples 6 and 7, the residue of carbon particles in the refractories was confirmed. Further, in Examples 6 and 7, no $Li_2O$ component was detected.

Further, in Examples 2 to 5 as Working Examples of the present invention, the reduction ratio of the $SiO_2$ component was from 67.6% to 98.9%, the reduction ratio of alkali components was from 87.8% to 99.6%, and the $Fe_2O_3$ reduction ratio was from 57.9% to 94.7%.

TABLE 1

| | | Ex. 1 | Ex. 2 | Ex. 3 | Ex. 4 |
|---|---|---|---|---|---|
| Amount of carbon added (%) | | 0.5 | 1.0 | 3.0 | 5.0 |
| Melting electric energy (KWH) | | 385 | 450 | 498 | 522 |
| Melting time (min) | | 70 | 80 | 87 | 92 |
| Chemical composition of product | $Al_2O_3$ | 47.2 | 49.16 | 52.24 | 53.61 |
| | $SiO_2$ | 8.5 | 4.8 | 1.6 | 0.35 |
| | $ZrO_2$ | 43.4 | 45.5 | 45.8 | 45.8 |
| | $Na_2O$ | 0.46 | 0.21 | 0.09 | 0.02 |
| | $K_2O$ | 0.15 | 0.07 | 0.03 | 0.01 |
| | $Fe_2O_3$ | 0.11 | 0.08 | 0.06 | 0.02 |
| | $TiO_2$ | 0.08 | 0.07 | 0.07 | 0.08 |
| | CaO | 0.07 | 0.08 | 0.08 | 0.09 |
| | MgO | 0.03 | 0.03 | 0.03 | 0.02 |
| Residual carbon particles | | Nil | Nil | Nil | Nil |
| $SiO_2$ reduction ratio (%) | | 42.6 | 67.6 | 89.2 | 97.6 |
| Alkali components reduction ratio (%) | | 73.4 | 87.8 | 94.8 | 98.7 |
| $Fe_2O_3$ reduction ratio (%) | | 42.1 | 57.9 | 68.4 | 89.5 |
| Average voltage (V) | | 160 | 160 | 160 | 160 |
| Average power (W) | | 330 | 338 | 343 | 340 |

TABLE 2

| | | Ex. 5 | Ex. 6 | Ex. 7 |
|---|---|---|---|---|
| Amount of carbon added (%) | | 8.0 | 10.0 | 12.0 |
| Melting electric energy (KWH) | | 585 | 650 | 652 |
| Melting time (min) | | 102 | 118 | 120 |
| Chemical composition of product | $Al_2O_3$ | 54.13 | 52.06 | 51.26 |
| | $SiO_2$ | 0.17 | 0.75 | 0.74 |
| | $ZrO_2$ | 45.5 | 46.8 | 47.6 |
| | $Na_2O$ | 0.01 | 0.15 | 0.15 |
| | $K_2O$ | 0.00 | 0.03 | 0.02 |
| | $Fe_2O_3$ | 0.01 | 0.04 | 0.04 |
| | $TiO_2$ | 0.08 | 0.07 | 0.08 |
| | CaO | 0.08 | 0.08 | 0.08 |
| | MgO | 0.02 | 0.02 | 0.03 |
| Residual carbon particles | | Nil | Present | Present |
| $SiO_2$ reduction ratio (%) | | 98.9 | 94.9 | 94.9 |
| Alkali components reduction ratio (%) | | 99.6 | 92.1 | 92.6 |
| $Fe_2O_3$ reduction ratio (%) | | 94.7 | 78.9 | 78.9 |
| Average voltage (V) | | 160 | 160 | 140 |
| Average power (W) | | 344 | 331 | 326 |

[Case (2) of AZS-Type Electrofused Refractory]

Another spent AZS-type electrofused refractory (the chemical components were 51.39% of $Al_2O_3$, 12.0% of $SiO_2$, 32.8% of $ZrO_2$, 1.9% of $Na_2O$, 0.11% of $K_2O$, 0.15% of $Fe_2O_3$, 0.07% of $TiO_2$, 0.06% of CaO, 0.03% of MgO, 0.50% of $Co_2O_3$, 0.49% of NiO and 0.50% of ZnO) was used as a spent refractory raw material, and the process was carried out under such conditions that the raw material was 100 kg, the amount of carbon added was 4%, the melting time was 90 minutes, the average voltage was 160 V, the average power was 320 kw and the melting electric energy was 500 kwh.

The chemical components of the obtained refractory particles were 61.54% of $Al_2O_3$, 0.62% of $SiO_2$, 37.6% of $ZrO_2$, 0.07% of $Na_2O$, 0.01% of $K_2O$, 0.01% of $Fe_2O_3$, 0.05% of $TiO_2$, 0.06% of CaO, 0.02% of MgO, 0.01% of $Co_2O_3$, 0.01% of NiO and 0.00% of ZnO, and thus, it was confirmed that components such as $SiO_2$, $Na_2O$, $K_2O$, $Fe_2O_3$, $Co_2O_3$, NiO and ZnO were substantially reduced. Further, the reduction ratio of the $SiO_2$ component was 94.8%, the reduction ratio of alkali components was 96.0%, and the $Fe_2O_3$ reduction ratio was 93.3%.

Further, a part of the melt was cast into a mold without blowing of the compressed air, and the amount of residual carbon was measured. For the measurement, a measuring apparatus (tradename: CS-400, manufactured by RECO Japan) by a radio-frequency heating type infrared absorption method, was used. The amount of carbon in the refractory particles recovered in a collection box was 150 ppm, but the amount of carbon in an ingot cast into the mold was 380 ppm. Thus, it was confirmed that oxidation was promoted by this process.

[Case of Z-Type Electrofused Refractory]

As a spent refractory to be used as a raw material, a Z-type electrofused refractory used in a glass melting furnace (the chemical components were 0.65% of $Al_2O_3$, 4.9% of $SiO_2$, 93.26% of $ZrO_2$, 0.71% of $Na_2O$, 0.09% of $K_2O$, 0.25% of $Fe_2O_3$, 0.07% of $TiO_2$, 0.05% of CaO and 0.02% of MgO, and the particle size was such that the particles passed through a sieve aperture of 30 mm) was used, and the process of the present invention was carried out under such conditions that the raw material was 100 kg, the amount of carbon added was 5%, the melting time was 120 minutes, the average voltage was 160 V, the average power was 275 kw and the melting electric energy was 550 kwh.

The chemical components of the obtained refractory particles were 0.70% of $Al_2O_3$, 0.43% of $SiO_2$, 98.69% of $ZrO_2$, 0.03% of $Na_2O$, 0.01% of $K_2O$, 0.01% of $Fe_2O_3$, 0.06% of $TiO_2$, 0.05% of CaO and 0.02% of MgO, and it was confirmed that components such as $SiO_2$, $Na_2O$, $K_2O$ and $Fe_2O_3$ were substantially reduced. Further, the reduction ratio of the $SiO_2$ component was 91.2%, the reduction ratio of alkali components was 95.0%, and the reduction ratio of the $Fe_2O_3$ component was 96.0%.

[Case (3) of AZS-Type Electrofused Refractory]

Under such conditions that the raw material was 100 kg, the melting time was 90 minutes, the average voltage was 160 V, the average power was 320 kw and the melting electric energy was 480 kwh, the process of the present invention was carried out under such constant conditions except that the particle size of carbon particles was changed with the amount of carbon particles added being 5%, to ascertain the optimum particle size of the carbon particles to be used. The results are shown in Table 3.

In Table 3, the particle sizes "−0.1", "−0.5" and "−1" of the carbon particles show that the respective particles passed through sieve apertures of 0.1 mm, 0.5 mm and 1 mm, respectively, and "1 to 3" shows that the particles passed through a sieve aperture of 3 mm but did not pass through a sieve aperture of 1 mm. "−15" shows that the particles passed through a sieve aperture of 15 mm. The presence or absence of the residual carbon particles was visually confirmed and evaluated.

As an index for judging the high purification, judgment was made whether or not the content of impurities satisfies the required level for recycling as a raw material for electrofused refractories i.e. whether or not the total amount of alkali components ($Na_2O+K_2O+Li_2O$) in the product is at most 0.3%, and the $Fe_2O_3$ component is at most 0.1%. In Table 3, one wherein the content of impurities satisfies the required level for recycling as a raw material for electrofused refractories, is identified by ◯, and one wherein the content of impurities does not satisfy the required level for a raw material of electrofused refractories, is identified by x. From Table 3, it is evident that the particle size of carbon particles to be added is preferably from 1 to 10 mm.

TABLE 3

| Example | Particle size of carbon (mm) | Content of impurities | Presence or absence of residual carbon particles |
|---|---|---|---|
| 8 | −0.1 | X | Absent |
| 9 | −0.5 | X | Absent |
| 10 | 0.5 to 1 | X | Absent |
| 11 | 1 to 3 | ◯ | Absent |
| 12 | 2 to 5 | ◯ | Absent |
| 13 | 5 to 10 | ◯ | Absent |
| 14 | −15 | X | Present |
| 15 | 10 to 20 | X | Present |
| 16 | 20 to 30 | X | Present |

[Case (4) of AZS-Type Electrofused Refractory]

Under such conditions that the raw material was 100 kg, the melting time was 90 minutes, the average voltage was 160 V, the average power was 320 kw and the melting electric energy was 480 kwh, carbon particles having the optimum particle size in the case (3) of AZS-type electrofused refractory were selected with an amount of carbon particles added being 5%, and the optimum intervals for introduction of the mixed raw material for melting whereby melting was stably carried out, was confirmed. The conditions were constant except that the size of the carbon particles and the intervals for introduction of the mixed material for melting were changed.

Further, the particle size of carbon particles used was selected to be from 1 to 10 mm, whereby the high purification level was satisfied in [CASE (3) OF AZS-TYPE ELECTROFUSED REFRACTORY]. The stability for melting is represented by the state of molten bath such that "x: the molten bath undergoes a vigorous reaction and boils up so that the operation may no longer be continued", "◯: the molten bath boils up a little, but can be controllable", and "⊚: the molten bath is stabilized without any particular problem". The results are shown in Table 4 together with the melting time until white fume completely settles and the reaction terminates.

From the comparison between Example 17 and Example 19 in Table 4, it is evident that in a case where the intervals for introduction of the mixed raw material were constant, the state of molten bath was stabilized by reducing the amount of the raw material per one introduction and increasing the number of times of introduction of the raw material. The same was confirmed also from the comparison between Example 20 and Example 21 and the comparison between Example 22 and Example 24. From the comparison between Examples 18 and 19, it was found that in a case where the particle sizes of carbon particles added were the same, and the number of times of introduction of the raw material and the amount of the raw material introduced were the same, the state of molten bath was stabilized as the intervals for introduction of the raw material were long. From the comparison between Example 17 and Example 22, in a case where only the particle sizes of carbon particles were different, and the method for introducing the mixed raw material for melting (the number of times of introduction of the mixed raw material for melting, the intervals for introduction of the mixed material for melting and the amount of the mixed raw material for melting introduced) was the same, such a tendency that the melting time becomes long, was confirmed.

TABLE 4

| Example | Particle size of carbon particles added (mm) | Number of times of introduction of the mixed raw material for melting (times) | Intervals for introduction of the mixed raw material for melting (min) | Amount of the mixed raw material for melting (kg/time) | State of molten bath | Melting time (min) |
|---|---|---|---|---|---|---|
| 17 | 1 to 3 | 5 | 10 | 20 | ◯ | 80 |
| 18 | 1 to 3 | 8 | 7 | 12.5 | ◯ | 82 |
| 19 | 1 to 3 | 8 | 10 | 12.5 | ⊚ | 78 |
| 20 | 2 to 5 | 8 | 7 | 12.5 | ◯ | 85 |
| 21 | 2 to 5 | 10 | 7 | 10 | ⊚ | 80 |
| 22 | 5 to 10 | 5 | 10 | 20 | ◯ | 82 |
| 23 | 5 to 10 | 15 | 5 | 6.7 | ⊚ | 98 |
| 24 | 5 to 10 | 10 | 10 | 10 | ⊚ | 102 |

[Case (5) of AZS-Type Electrofused Refractory]

High purification was attempted by using, as a raw material for a spent refractory, a grinding sludge which was a waste formed during the production of an AZS-type electrofused refractory.

With respect to the conditions, the melting was carried out under such conditions that the raw material was 100 kg, the amount of carbon added was 5%, the melting time was 90 minutes, the average voltage was 160 V, the average power was 320 kw and the melting electric energy was 480 kwh.

A grinding sludge of an AZS-type electrofused refractory comprising, as chemical components, 51.83 of $Al_2O_3$, 17.5% of $SiO_2$, 27.5% of $ZrO_2$, 2.35% of $Na_2O$, 0.14% of $K_2O$, 0.19% of $Fe_2O_3$, 0.11% of $TiO_2$, 0.12% of CaO, 0.09% of MgO, 0.10% of $Co_2O_3$ and 0.07% of NiO, was used as the raw material; the amount of carbon added was 7%; the melting time was 110 minutes; and the particle size of carbon and the amount of introduction were in accordance with Example 19 in Table 4.

The chemical components of the obtained refractory particles were 63.18% of $Al_2O_3$, 1.32% of $SiO_2$, 34.9% of $ZrO_2$, 0.11% of $Na_2O$, 0.01% of $K_2O$, 0.06% of $Fe_2O_3$, 0.12% of $TiO_2$, 0.14% of CaO, 0.04% of MgO, 0.02% of $Co_2O_3$ and 0.01% of NiO, and it was confirmed that components such as $SiO_2$, $Na_2O$, $K_2O$, $Fe_2O_3$, $Co_2O_3$ and NiO were substantially reduced. Further, the reduction ratio of the $SiO_2$ component was 92.5%, the reduction ratio of alkali components was 95.2%, and the reduction ratio of the $Fe_2O_3$ component was 68.4%.

[Case of AS-Type Electrofused Refractory]

Melting was carried out under such conditions that the raw material was 100 kg, the amount of carbon added was 3%, the melting time was 80 minutes, the average voltage was 140 V, the average power was 300 kw and the melting electric energy was 400 kwh, except that a spent AS-type electrofused refractory (the chemical components were 92.16% of $Al_2O_3$, 2.3% of $SiO_2$, 0.0% of $ZrO_2$, 3.9% of $Na_2O$, 1.1% of $K_2O$, 0.05% of $Fe_2O_3$, 0.04% of $TiO_2$, 0.4% of CaO and 0.05% of MgO) was used as a spent refractory raw material, and the lining refractory of the melting furnace was changed to an AS-type electrofused refractory free from contamination.

The chemical components of the obtained refractory particles were 99.12% of $Al_2O_3$, 0.21% of $SiO_2$, 0.0% of $ZrO_2$, 0.12% of $Na_2O$, 0.02% of $K_2O$, 0.02% of $Fe_2O_3$, 0.04% of $TiO_2$, 0.45% of CaO and 0.02% of MgO, and it was confirmed that components such as $SiO_2$, $Na_2O$, $K_2O$ and $Fe_2O_3$ were substantially reduced. Further, the reduction ratio of the $SiO_2$ component was 91%, the reduction ratio of alkali components was 97.0%, and the reduction ratio of the $Fe_2O_3$ component was 60.0%.

[Case of AZS-Type Bonded Refractory]

A spent AZS-type bonded refractory (the chemical components were 52.54% of $Al_2O_3$, 14.5% of $SiO_2$, 31.8% of $ZrO_2$, 0.5% of $Na_2O$, 0.1% of $K_2O$, 0.18% of $Fe_2O_3$, 0.15% of $TiO_2$, 0.12% of CaO and 0.11% of MgO) was used as a spent refractory raw material, and melting was carried out under such conditions that the raw material was 100 kg, the amount of carbon added was 5%, the melting time was 90 minutes, the average voltage was 160 V, the average power was 320 kw and the melting electric energy was 480 kwh.

The chemical components of the obtained refractory particles were 66.24% of $Al_2O_3$, 0.24% of $SiO_2$, 33.0% of $ZrO_2$, 0.04% of $Na_2O$, 0.01% of $K_2O$, 0.08% of $Fe_2O_3$, 0.17% of $TiO_2$, 0.14% of CaO and 0.08% of MgO, and it was confirmed that components such as $SiO_2$, $Na_2O$, $K_2O$ and $Fe_2O_3$ were substantially reduced. Further, the reduction ratio of the $SiO_2$ component was 98%, the reduction ratio of alkali components was 92.0%, and the reduction ratio of the $Fe_2O_3$ component was 56%.

INDUSTRIAL APPLICABILITY

In the present invention, it is possible to increase the contents of the $ZrO_2$ component and/or the $Al_2O_3$ component in a spent refractory having prescribed chemical components, such as a spent electrofused refractory used in e.g. a glass melting furnace, to levels not practically problematic and thereby to produce highly purified useful refractory particles by a simplified production process which is excellent also in productivity. Further, the obtained refractory particles can be recycled also as a refractory raw material, for which a high purity is required, and thus are industrially useful.

The entire disclosure of Japanese Patent Application No. 2007-316416 filed on Dec. 6, 2007 including specification, claims, drawings and summary is incorporated herein by reference in its entirety.

What is claimed is:

1. A process for producing refractory particles, which comprises introducing to and melting in a melting furnace both a spent refractory which contains, by mass % as chemical components, from 75 to 97% of at least one of $ZrO_2$ and $Al_2O_3$, from 2 to 25% of $SiO_2$, from 0.4 to 7% in total of $Na_2O$, $K_2O$ and $Li_2O$, at most 2% of CaO and at most 2% of MgO, wherein mass % is based on the total mass of the $ZrO_2$, the $Al_2O_3$, the $SiO_2$, the $Na_2O$, the $K_2O$, the $Li_2O$, the CaO and the MgO, and carbon particles in an amount of from 1 to 8% by mass percentage, wherein mass percentage is based on the total mass of the spent refractory, and after the melting, tapping the melt while blowing compressed air against the melt to form refractory particles having the content of at least one of $ZrO_2$ and $Al_2O_3$ that is greater than the content of at least one of the $ZrO_2$ and the $Al_2O_3$ in the spent refractory.

2. The process for producing refractory particles according to claim 1, wherein the spent refractory and the carbon particles are added and mixed to form a mixed raw material for melting before introducing them to the melting furnace, and then the mixed raw material for melting is introduced to the melting furnace.

3. The process for producing refractory particles according to claim 2, wherein the number of times of introducing the mixed raw material for melting to the melting furnace is at least 5 times.

4. The process for producing refractory particles according to claim 2, wherein the mixed raw material for melting is introduced to the melting furnace in portions at intervals of at most 20 minutes.

5. The process for producing refractory particles according to claim 1, wherein water is blown against the melt at the same time as the compressed air.

6. The process for producing refractory particles according to claim 1, wherein the carbon content in the refractory particles is at most 200 ppm.

7. The process for producing refractory particles according to claim 1, wherein at least 90 mass % of the refractory particles have a particle diameter of at most 15 mm.

8. The process for producing refractory particles according to claim 1, wherein the $Fe_2O_3$ content in the refractory particles is at most 0.1%.

9. The process for producing refractory particles according to claim 1, wherein the reduction ratio of the $SiO_2$ component in the refractory particles to the $SiO_2$ component in the spent refractory is at least 75%.

10. The process for producing refractory particles according to claim 1, wherein the content of $Na_2O$, $K_2O$ and $Li_2O$ in total in the refractory particles is at most 0.3%.

11. The process for producing refractory particles according to claim 1, wherein the total amount of alkali components in the refractory particles is less than 0.4%.

12. The process for producing refractory particles according to claim 1, wherein during the tapping the melting furnace is tilted and the melt flows from the melting furnace.

13. The process for producing refractory particles according to claim 12, wherein the melt flows from the melting furnace and falls about 100 mm while the compressed air is blown against the melt.

14. The process for producing refractory particles according to claim 1, wherein the compressed air is blown against the melt at a pressure of at least 1 MPa.

15. The process for producing refractory particles according to claim 1, wherein the carbon content in the refractory particles is at most 200 ppm.

16. The process for producing refractory particles according to claim 1, wherein the melting furnace is an arcing melting furnace.

* * * * *